United States Patent
Vivanco

(10) Patent No.: US 9,462,476 B1
(45) Date of Patent: *Oct. 4, 2016

(54) IDENTIFYING UNSUBSCRIBED TETHERING IN A WIRELESS NETWORK

(71) Applicant: Sprint Communications Company L.P., Overland Park, KS (US)

(72) Inventor: Daniel Alberto Vivanco, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,136

(22) Filed: Nov. 9, 2015

Related U.S. Application Data

(63) Continuation of application No. 14/071,400, filed on Nov. 4, 2013, now Pat. No. 9,226,141.

(51) Int. Cl.
| | | |
|---|---|---|
| *H04W 12/08* | (2009.01) | |
| *G06F 21/88* | (2013.01) | |
| *H04L 29/12* | (2006.01) | |
| *H04L 29/06* | (2006.01) | |
| *H04W 12/02* | (2009.01) | |

(52) U.S. Cl.
CPC ............ *H04W 12/08* (2013.01); *G06F 21/88* (2013.01); *H04L 61/2514* (2013.01); *H04L 63/0236* (2013.01); *H04L 63/101* (2013.01); *H04W 12/02* (2013.01)

(58) Field of Classification Search
CPC ............ H04L 63/102; H04L 61/2521; H04L 63/1466; H04L 63/1416; H04L 63/1425; H04L 63/0892; H04L 63/10; H04L 63/0876; H04W 12/08; H04W 12/02; G06F 21/88; G06F 2221/033

See application file for complete search history.

(56) References Cited

U.S. PATENT DOCUMENTS

| | | | |
|---|---|---|---|
| 5,517,568 A | 5/1996 | Grube et al. | |
| 6,636,894 B1 * | 10/2003 | Short | H04L 12/2856 709/225 |
| 7,127,524 B1 | 10/2006 | Renda et al. | |
| 7,617,536 B2 | 11/2009 | Nonaka et al. | |
| 7,653,746 B2 | 1/2010 | Touch et al. | |
| 7,672,283 B1 | 3/2010 | Chang et al. | |

(Continued)

OTHER PUBLICATIONS

Brian X. Chen, "AT&T Tells Free Tethering Customers It's Time to Pay up", Mar. 18, 2011. Availlable at: http://www.wired.com/gadgetlab/2011/03/att-tethering/.

(Continued)

*Primary Examiner* — Jung Kim
*Assistant Examiner* — James J Wilcox

(57) ABSTRACT

Systems, methods, and computer-readable media for identifying and managing wireless devices that are performing tethering services are described. The system may include a database and server. The database stores records of services subscribed by wireless devices in a wireless network. The server may poll the database to generate a list of wireless devices that are not subscribed to a tethering service. In turn, the server receives notification messages from each wireless device that is tethering at least one other network element. The wireless devices are identified as unauthorized by the server when the notification message indicates existence of a configured network address translation table at the wireless device and the wireless device is located on the list of wireless devices that are not subscribed to the tethering service.

12 Claims, 6 Drawing Sheets

(56) References Cited

U.S. PATENT DOCUMENTS

| | | | |
|---|---|---|---|
| 7,843,327 | B1 | 11/2010 | DiMartino et al. |
| 8,473,625 | B1 | 6/2013 | Reeves et al. |
| 8,638,790 | B2 | 1/2014 | Mir et al. |
| 8,701,166 | B2 | 4/2014 | Courtney et al. |
| 9,351,193 | B2* | 5/2016 | Raleigh ............. H04W 28/0289 |
| 2002/0108058 | A1* | 8/2002 | Iwamura ................. G06F 21/88 726/35 |
| 2003/0087629 | A1* | 5/2003 | Juitt ......................... H04L 1/22 455/411 |
| 2004/0049586 | A1* | 3/2004 | Ocepek ............ H04L 29/12009 709/229 |
| 2008/0225865 | A1 | 9/2008 | Herzog |
| 2010/0161795 | A1* | 6/2010 | Deridder ................ H04L 67/22 709/224 |
| 2010/0302974 | A1 | 12/2010 | Niiyama et al. |
| 2012/0113841 | A1* | 5/2012 | Todd ................ H04L 29/12367 370/252 |
| 2012/0167162 | A1* | 6/2012 | Raleigh ................... G06F 21/57 726/1 |
| 2012/0236733 | A1 | 9/2012 | Deu-Ngoc et al. |
| 2012/0240197 | A1* | 9/2012 | Tran .................... H04L 63/1416 726/4 |
| 2013/0152176 | A1 | 6/2013 | Courtney et al. |
| 2013/0159503 | A1* | 6/2013 | Erman .................. H04W 12/12 709/224 |
| 2013/0254264 | A1* | 9/2013 | Hankinson ........ H04L 29/06047 709/203 |
| 2014/0006593 | A1* | 1/2014 | Sarawat ................ H04M 15/58 709/224 |
| 2014/0098671 | A1* | 4/2014 | Raleigh ................. H04M 15/80 370/235 |
| 2014/0248852 | A1* | 9/2014 | Raleigh ............... H04M 15/723 455/407 |

OTHER PUBLICATIONS

Joe, "How to Enable Hotspot Tethering on iOS 6 (No Jailbreak Required)", Jul. 7, 2013. Available at: http://web.archive.org/web/20131016133111/http://www.itweakios.com/apps/blog/show/29936522-how-to-enable-hotspot-tethering-on-ios-6-no-jailbreak-required-.

"AT&T Cracking Down on MyWi Tethering?", 2013, Available at http://modmyi.com/forums/iphone-news/755094-t-cracking-down-mywi-tethering.html.

First Action Interview Preinterview Communication dated May 1, 2015 in U.S. Appl. No. 14/071,400, 6 pages.

Notice of Allowance dated Aug. 24, 2015 in U.S. Appl. No. 14/071,400, 19 pages.

\* cited by examiner

```
#iptables -t filter -L
Chain INPUT (policy ACCEPT)
target      prot opt source            destination Chain FORWARD (policy ACCEPT)
target      prot opt source            destination
DROP        0   --  anywhere           anywhere           state INVAL
ID
wireless-tether  0        anywhere Chain OUTPUT (policy ACCEPT)
target      prot opt source            destination Chain wireless-tether (1 references)
target      prot opt source            destination
ACCEPT      0   --  anywhere           anywhere           state INVAL
ED, ESTABLISHED
FIX ME! implement genetbyaddr() bionic/libc/bionic/stubs.c:372
ACCEPT      0   --  192.168.2.0/24     anywhere
FIX ME! implement getprotobynumber() bionic/libc/bionic/stubs.c:384
ACCEPT      47  --  anywhere           anywhere
DROP        0   --  anywhere           anywhere
```

FIG. 4

IDENTIFYING UNSUBSCRIBED TETHERING IN A WIRELESS NETWORK

PRIORITY

This application is a continuation of U.S. application Ser. No. 14/071,400, now U.S. Pat. No. 9,226,141 B1 filed Nov. 4, 2013, and entitled "IDENTIFYING UNSUBSCRIBED TETHERING IN A WIRELESS NETWORK," which is hereby incorporated by reference in its entirety.

SUMMARY

Embodiments of the invention are defined by the claims below, not this summary. A high-level overview of various embodiments of the invention are provided here for that reason, to provide an overview of the disclosure, and to introduce a selection of concepts that are further described in the detailed description below. This summary is not intended to identify key features or essential features of the claimed subject matter, nor is it intended to be used as an aid in isolation to determine the scope of the claimed subject matter.

In one embodiment, a tethering server is configured to manage traffic for wireless devices that are unsubscribed to a tethering service. The wireless network provider may provide the tethering service to wireless devices that have subscribed for the service. The tethering server may identify computing devices that are tethered to an unsubscribed wireless device.

In certain embodiments, the wireless device operates in Hotspot mode. When in Hotspot mode, the wireless device operates as a private router for tethered devices. To facilitate proper routing, the wireless device creates an (Internet Protocol) IP routing table (e.g., a network address translation (NAT) table) is created by the wireless device to route communications for the tethered devices over the wireless network.

The tethering server may receive messages having an indication that a NAT table exists for each wireless device in the wireless network. The tethering server may store a list of wireless devices that are unsubscribed to tethering services. This list is checked to determine whether a wireless device on the list has generated a NAT table. If the tethering server determines that a wireless device on the list has sent a message indicating that a NAT exists, then the tethering server may perform any combination of the following actions: block all traffic from the wireless device, shape traffic from the wireless device by limiting usage of the wireless network, or generating a dialog that notifying the wireless device that a subscription to the tethering service is necessary.

BRIEF DESCRIPTION OF THE SEVERAL VIEWS OF THE DRAWINGS

Illustrative embodiments of the invention are described in detail below with reference to the attached drawing figures, and wherein:

FIG. 4 is a graphical user interface illustrating a screenshot of a NAT on a wireless device that does tether additional network elements, in accordance with an embodiment of the invention;

DETAILED DESCRIPTION

Figure 1:
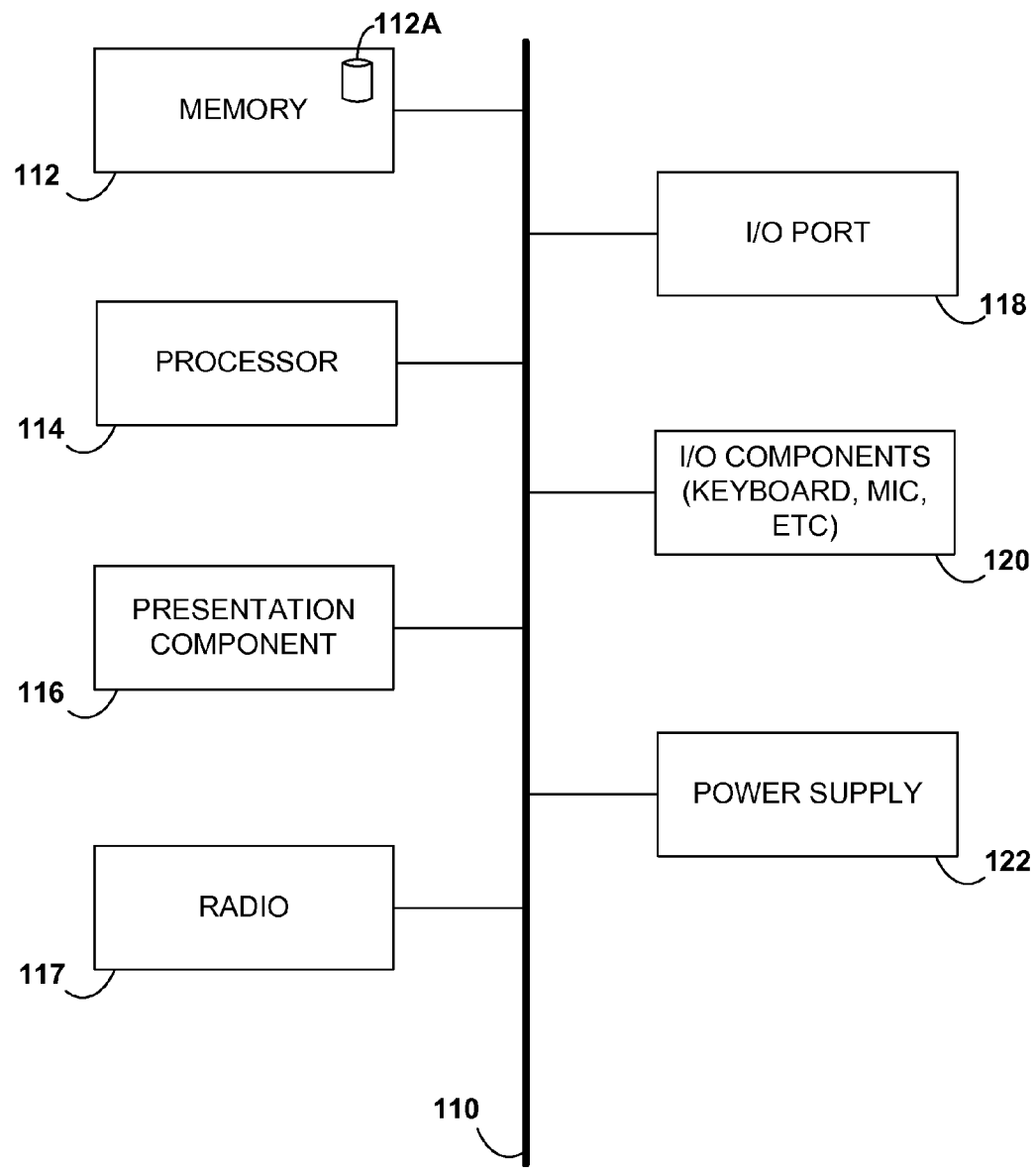
FIG. 1 is a block diagram of an exemplary computing environment, in accordance with an embodiment of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" or "block" might be used herein to connote different acts of methods, the terms should not be interpreted as implying any particular order among or between various acts herein disclosed unless and except when the order of individual acts is explicitly described.

Throughout this patent, several acronyms and shorthand notations are used to aid the understanding of certain concepts pertaining to the associated embodiments. These acronyms and shorthand notations are solely intended for the purpose of providing an easy methodology of communicating the ideas expressed herein and are in no way meant to limit the scope of embodiments of the invention. The following is a list of these acronyms:

3GPP Third Generation Partnership Project
AAA Authentication Authorization Accounting
CDMA Code Division Multiple Access
CD-ROM Compact Disk Read Only Memory
DVD Digital Versatile Discs
EEPROM Electrically Erasable Programmable Read Only Memory
GPRS General Packet Radio Service
GSM Global System for Mobile Communications
IP Internet Protocol
LAN Local Area Network
LTE Long Term Evolution
MDN Mobile Directory Number
NAT Network Address Translation
PC Personal Computer
PDA Personal Digital Assistant
RAM Random Access Memory
ROM Read Only Memory
TCP Transmission Control Protocol
UMTS Universal Mobile Telecommunication System
USB Universal Serial Bus
WAN Wide Area Network
Wi-Fi Wireless Fidelity Embodiments of the invention may be embodied as, among other things, a method, system, or a computer-program product. Accordingly, the embodiments may take the form of a hardware embodiment, a software embodiment, or an embodiment combining software and hardware. In one embodiment, a computer-program product that includes computer-useable instructions is embodied on one or more computer-readable media.

As used herein, "tethering" refers to the use of an Internet-enabled wireless device as a modem for another network element (i.e., laptop, camera, tablet, or e-reader). The connection to the wireless device may be made either with a cable (i.e., USB or serial) or wirelessly (i.e., Bluetooth or Wi-Fi).

Generally, wireless operators charge extra fees for tethering services. A wireless device may subscribe to a tethering service after a user of the wireless device pays the extra fees. The subscribed wireless devices may tether other network elements to the wireless network. In one embodiment, unsubscribed wireless devices may attempt to provide free Internet access to other network elements that are tethered to the unsubscribed device. A tethering server may manage the network traffic for the unsubscribed wireless devices.

The tethering server may reduce the lost billing opportunities for the unsubscribed device by providing a dialog that requests that the user of the wireless device subscribe to the tethering service. Additionally, the tethering server may reduce network congestion caused by the unsubscribed devices. For instance, the tethering service may block traffic for the wireless device or limit the network usage to a specific bandwidth level per minute or per hour (1 MB/min or 10 MB/hour).

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

In one embodiment, a tethering server is configured with several input and output components. The tethering server may include applications for limiting traffic for the unsubscribed wireless devices. The applications may include generating a possible offender list, providing a registration dialog to unsubscribed wireless devices, or shaping network traffic for the unsubscribed devices that are identified as tethering other network elements to the wireless network.

FIG. 1 depicts a block diagram of an exemplary computing environment in accordance with embodiments of the invention. Turning now to FIG. 1, a block diagram of an illustrative computing device 100 (e.g., tethering server, AAA server, subscriber database, wireless device) is provided and referenced generally by numeral 100. Although some components are shown in the singular, they may be plural. For example, computing device 100 might include multiple processors or multiple radios, etc. A computing device 100 may be one of many devices, including, but not limited to, a switch, a router, a mobility agent, or a bridge. As illustratively shown, computing device 100 includes a bus 110 that directly or indirectly couples various components including memory 112, a processor 114, a presentation component 116, a radio 117, input/output ports 118, input/output components 120, and a power supply 122.

We have previously described various memory components that memory 112 might take the form of. Memory component 112 can include any type of medium that is capable of storing information (e.g., a database 112A). The database 112A may be configured to store network access credentials, including a network identifier, password, or key associated with the computing device; location information based on GPS; and any information that the computing device transmits to the wireless network. The database 112A may also store applications like traffic shaping applications that limit network traffic for unsubscribed devices. In some embodiments, a registration dialog may also be stored in the database 112A. If needed, the registration dialog may also be stored remotely when the memory component 112 is of limited capacity.

Processor 114 might actually be multiple processors that receive instructions associated with the applications and process the instructions accordingly. Presentation component 116 includes the likes of a display and a speaker, as well as other components that can present information (such as a lamp (LED), or even lighted keyboards) associated with the outputs of applications or other components of the computing device 100.

The computing device 100 may store cell sector information and carrier information for the wireless network. The carrier information may include carrier profiles of the wireless network. The carrier information may include, among other things, session assignment, packets processed by the carrier, start times for sessions, and end times for sessions.

The communication interface of the computing device 100 may be a radio 117 that facilitates communication with a wireless telecommunications network. Illustrative wireless telecommunications technologies include CDMA, GPRS, TDMA, GSM, WiMAX, LTE, UMTS, and the like. In some embodiments, radio 117 might also facilitate other types of wireless communications including Wi-Fi communications, Bluetooth™, Zigbee, or other near-field communication. In other embodiments, the communication interface of the computing device 100 may be a wired line like Ethernet.

Input/output port 118 of computing device 100 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network server 100. Power supply 122 includes items such as batteries, fuel cells, or any other component that can act as a power source to power computing device 100.

Accordingly, a computing device 100 may be configured to monitor network traffic for one or more sectors of a wireless network. The computing device may execute a traffic shaper that limits the traffic generated on the wireless network based on whether wireless devices on the wireless network are subscribed to tethering services. It will be understood and appreciated by those of ordinary skill in the art that the computing device 100 shown in FIG. 1 is merely an example of one suitable network server 100 and is not intended to suggest any limitation as to the scope of use or functionality of the embodiments of the invention. Neither should the network server 100 be interpreted as having any dependency or requirement related to any single component or combination of components illustrated therein. The single unit depictions are meant for clarity, not to limit the scope of embodiments in any form.

In one embodiment, a tethering server may detect use of NAT at each wireless device on the wireless network. NAT enables communication between private and public network elements in a home routing environment. NAT modifies IP (and port) address information in IP Packet header while in transit across the router (e.g., wireless device in Hotspot mode). In certain embodiments, the wireless device may perform NAT to allow network elements on a private network to access the Internet using a single public IP address (assigned by the ISP) for the wireless device. The tethering server allows this type of access to wireless network if the wireless device has subscribed to a tethering service. Unsubscribed devices attempt to gain free Internet access, which may increase the expected bandwidth usage and may cause unplanned network resources exhaustion. A large number of wireless devices engaged into unsubscribed tethering during peak hours may cause network congestion and deterioration of usage experience for legitimate users in the network. These illegitimate network elements may invalidate the expected bandwidth-cost model for the wireless carrier. The tethering server, in at least one embodiment, remedies these concerns by, among other things, shaping traffic from unsubscribed devices.

Figure 2:
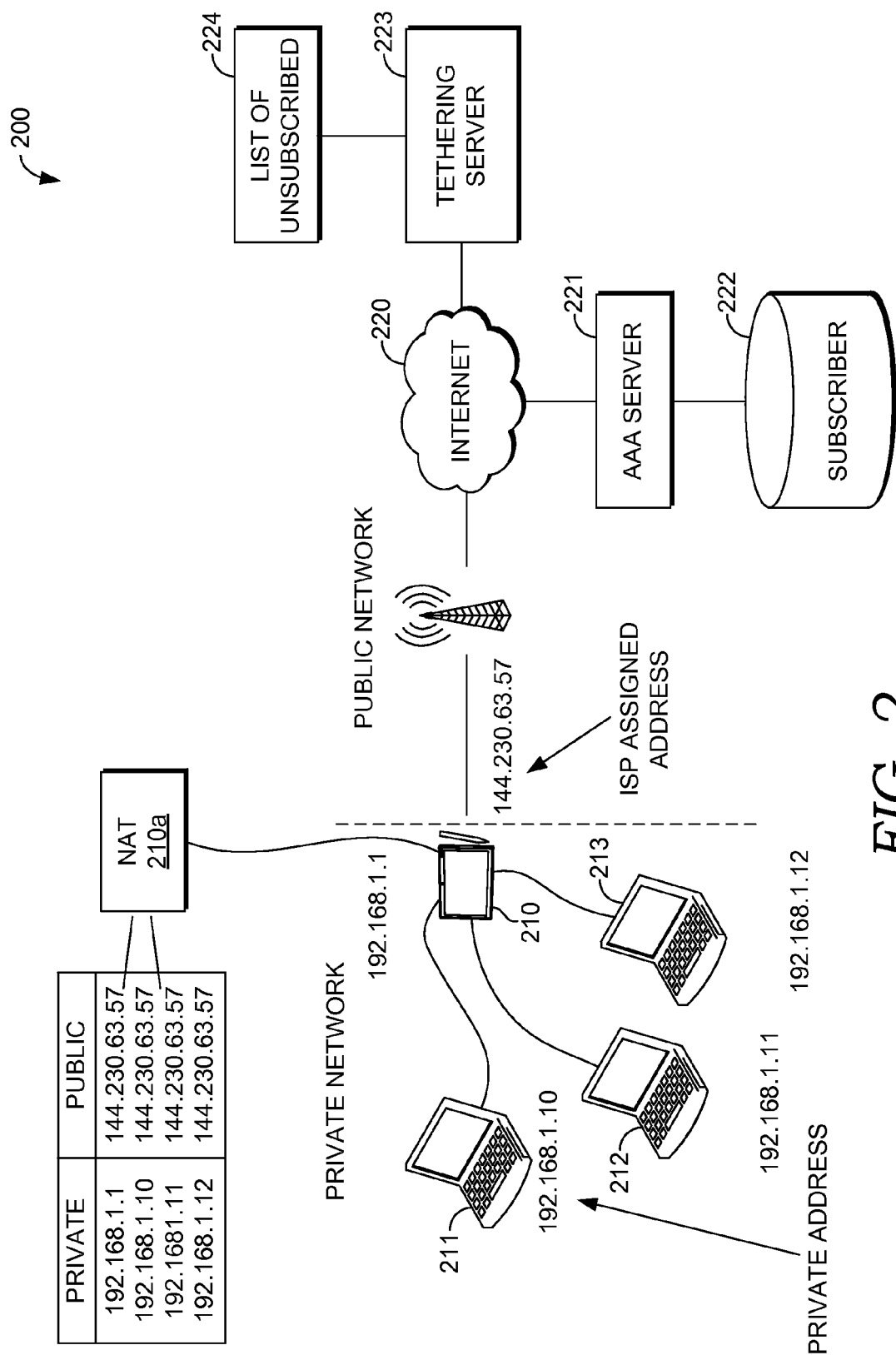
FIG. 2 is a network diagram illustrating the network elements employed to identify unsubscribed tethering, in accordance with an embodiment of the invention.

FIG. 2 is a network diagram illustrating the network elements employed to identify unsubscribed tethering, in accordance with an embodiment of the invention. A communication system 200 may include a private network and a public network. The private network may include a wireless device 210 and network elements (211, 212, or 213) that are tethered to the wireless device 210. The public network may include the Internet 220 and a wireless network available to the wireless device 210. The public network may also include AAA server 221, subscriber database 222, tethering server 223, and a list of unsubscribed wireless devices.

The wireless device 210 is an Internet-enabled device. It may connect to the wireless network via a base station. The wireless device 210 may subscribe to communication services provided by a wireless provider. The communication services may include, among other things, Internet service, voice service, mapping services, multimedia services, etc. In one embodiment, the wireless device 210 may operate in hotspot mode and allow other network elements (e.g., phones, laptops, e-readers, etc.) access the Internet through the wireless device 210. When in hotspot mode, the wireless device 210 may generate a NAT table 210*a*.

The NAT table 210*a* allows the wireless device to route communication for tethered devices. The NAT table 210*a* includes the IP addresses for the wireless device 210 and the network elements (211, 212, or 213) that connect to the wireless network. The NAT table 210*a* may include IP addresses for the wireless device 210 and the network elements (211, 212, or 213).

The IP addresses in the NAT table 210*a* may include public addresses and private addresses. The public address may be assigned by the wireless provider or an Internet service provider. In some embodiments, the wireless device 210 is assigned both a public address and a private address. The public address allows the wireless device 210 to communicate with other devices in a public network (e.g., the Internet). The private address allows the wireless device 210 to communicate with other network elements in the private network. The NAT table 210*a* may be processed by the wireless device 210 to determine how many network elements (211, 212, or 213) that are tethered to the wireless device 210.

The network elements (211, 212, or 213) include, but are not limited to, smartphones, laptops, or e-readers. The network elements (211, 212, or 213) may tether to the wireless device 210 to obtain access the public network. The wireless device 210 may operate as a router when network elements (211, 212, or 213) are tethered to it. The network traffic destined to the network elements are routed through the wireless device 210. Furthermore, the network traffic generated by the network elements (211, 212, or 213) may be routed through the wireless device 210. The network elements (211, 212, or 213) may communicate with each other through the wireless device 210.

In certain embodiments, the wireless device 210 may execute an application that notifies the tethering server 223 if tethering service is executed by the wireless device 210. Each wireless device 210 in the wireless network may execute the application. In one embodiment, the application is a system feature that is embedded in the operating system. The application may periodically generate a notification message that is transmitted to the tethering server 223.

The notification message informs the tethering server 223 whether the NAT table 210*a* is present. The notification message may include at least two indicators. For instance, the message may have two fields: "IP Routing Table" and "Number of Tethered Devices."

The "IP Routing Table" field provides an indication of whether a NAT table 210*a* exists on the wireless device 210. The indication, in some embodiments, may include a Boolean indicator (0 or 1) or Logic indicator (Yes or No). For example, a "0" or "No" may indicate a NAT table 210*a* does not exist or is configured. A "1" or "Yes" may indicate that the NAT table 210*a* does exist. The wireless device 210 may populate this field based on whether the NAT table 210*a* is present or whether the NAT table 210*a* is configured. In at least one embodiment, the wireless device 210 may confirm that a NAT table 210*a* is present and configured based on a line count. When the line count for the NAT table 210*a* is above a specified line threshold, the wireless device confirms the presence and configuration of the NAT table 210*a*.

The "Number of Tethered Devices" field provides an indication of a number of devices that are tethered to the wireless device 210. The indication, in some embodiments, may include a Logic indicator (No or Yes) or Numeric indicator (0, 1, 2, 3, etc.). For example, a "No" or "0" may indicate that no entries are in the NAT table 210*a* (i.e., the NAT table 210*a* is unconfigured). A "Yes" or number greater than or equal to "1" may indicate that the NAT table 210*a* does exist and that at least one device is tethered to the wireless device 201. The numeric indicator may provide the precise number of tethered devices. The wireless device 210 may populate this field based on the number of entries included in the NAT table 210*a*.

The wireless device 210 periodically transmits the notification messages to a tethering server 223. In an alternate embodiment, the wireless device may transmit the NAT table 210*a* to the tethering service for processing instead of the notification messages. In one embodiment, the notification messages may be sent using high priority and reliable data delivery protocols i.e. TCP over UGS (unsolicited grant service).

The Internet 220 provides access to websites, search engines, and other network resources that are online. The Internet 220 may be accessed by the wireless device 210 and the network elements (211, 212, or 213). When accessing the Internet 220, the wireless device 210 and network elements (211, 212, or 213) utilize a public address. In at least one embodiment, the wireless device 210 and network elements (211, 212, or 213) may share the same public address.

The AAA server 221 accesses authorization, authentication, or accounting data for subscribers of the wireless provider. The AAA server 221 may access information on whether a subscriber has registered for tethering services. The AAA server 221 may query a subscriber database 222 for data on the wireless devices 210 that are registered to a subscriber.

The subscriber database 222 may provide results to the AAA server in response to a query. The subscriber database 222 may provide data confirming that a subscriber has registered for tethering service. In some embodiments, the data may include the number of authorized tethering devices, a limit on bandwidth usage for the wireless devices 210, and historical bandwidth usage for the wireless device. The subscriber database 222 may store a name for a subscriber, a device identifier for the wireless device, and an indication that the account for the subscriber is current.

The tethering server 223 is configured to identify unsubscribed wireless devices that are tethering network elements (211, 212, or 213). In other embodiments, the tethering server 223 may identify subscribed devices that are abusing their bandwidth privileges. The tethering server 223 may query the AAA server for a list of wireless devices that are not subscribed to a tethering service offered by the wireless device. The tethering server 223 may store the list as the list of unsubscribed 224. The tethering server 223, in some embodiments, may store the list of unsubscribed 224 in a database.

The list of unsubscribed 224 may provide a list of wireless devices that have not registered for tethering services. The list of unsubscribed 224 is a list of potential offenders. In other words, this list includes wireless devices 210 that may tether other network elements (211, 212, or 213). The list of unsubscribed 224 is used by the tethering server 223 to confirm that a wireless device 210 providing tethering services is unsubscribed.

In other words, the tethering server 223 confirms that wireless devices have not registered for tethering services. The list of unsubscribed 224 provides the tethering server with a number of wireless devices that are not paying for tethering services. The tethering server 224 receives the notification message from the wireless devices 210 on the wireless network. The tethering server 223 then checks whether the wireless device 210 that sent the notification message is on the list of unsubscribed 224. When the wireless device 210 is on the list of unsubscribed and the message indicates that a NAT table 210a is present, configured, and includes one or more tethered devices, the tethering server 223 may generate a command for the wireless network to present a registration dialog to the wireless device 210 or block traffic for the wireless device 210. When the wireless device 210 is on the list of unsubscribed and the message indicates that a NAT table 210a is not present, unconfigured, or includes zero tethered devices, the tethering server 223 does nothing. When the wireless device 210 is not on the list of unsubscribed and the message indicates that a NAT table 210a is present, configured, and includes one or more tethered devices, the tethering server 223 may limit traffic for the wireless device 210 if the device is above a specified bandwidth usage level or if the number tethered devices is above a specified tethered limit. When above the specified bandwidth usage level or over the specified tethered limit, the tethering server 223 may notify the wireless device 210 to upgrade the tethering service account. When the wireless device 210 is not on the list of unsubscribed and the message indicates that a NAT table 210a is not present, unconfigured, or includes zero tethered devices, the tethering server 223 may discard the notification message.

Accordingly, the wireless device 210 that operates in hotspot mode may identify unsubscribed wireless devices 210 that provide tethering service without paying the wireless network provider for access to this service. The wireless devices 210 generate and process NAT tables 210a to provide notification to a tethering server 223 that is responsible for managing the wireless devices 210 that provide tethering services to network elements (211, 212, or 213) in a private network. The NAT table translates private addresses for the network elements to public addresses. The wireless devices 210 communicate with the network elements (211, 212, or 213) in the private network via the private addresses. The public address may be used by the wireless device when routing messages of the network elements (211, 212, or 213) for devices or resources in the public network.

The wireless device may provide a view of its NAT table in response to a command from the notification application. The NAT table may be nonexistent, present, unconfigured, or configured. Based on the information extracted from the NAT table, the wireless device generates the notification messages with at least two fields: NAT status (0, 1) and entries in NAT table (1–n, where n is the number of devices in the private network). The periodicity for the notification messages generated by the wireless device may be based on network congestion. For instance, the wireless device may generate the notification message every 5 minutes during high congestion or every 30 minutes during low congestion.

Figure 3:
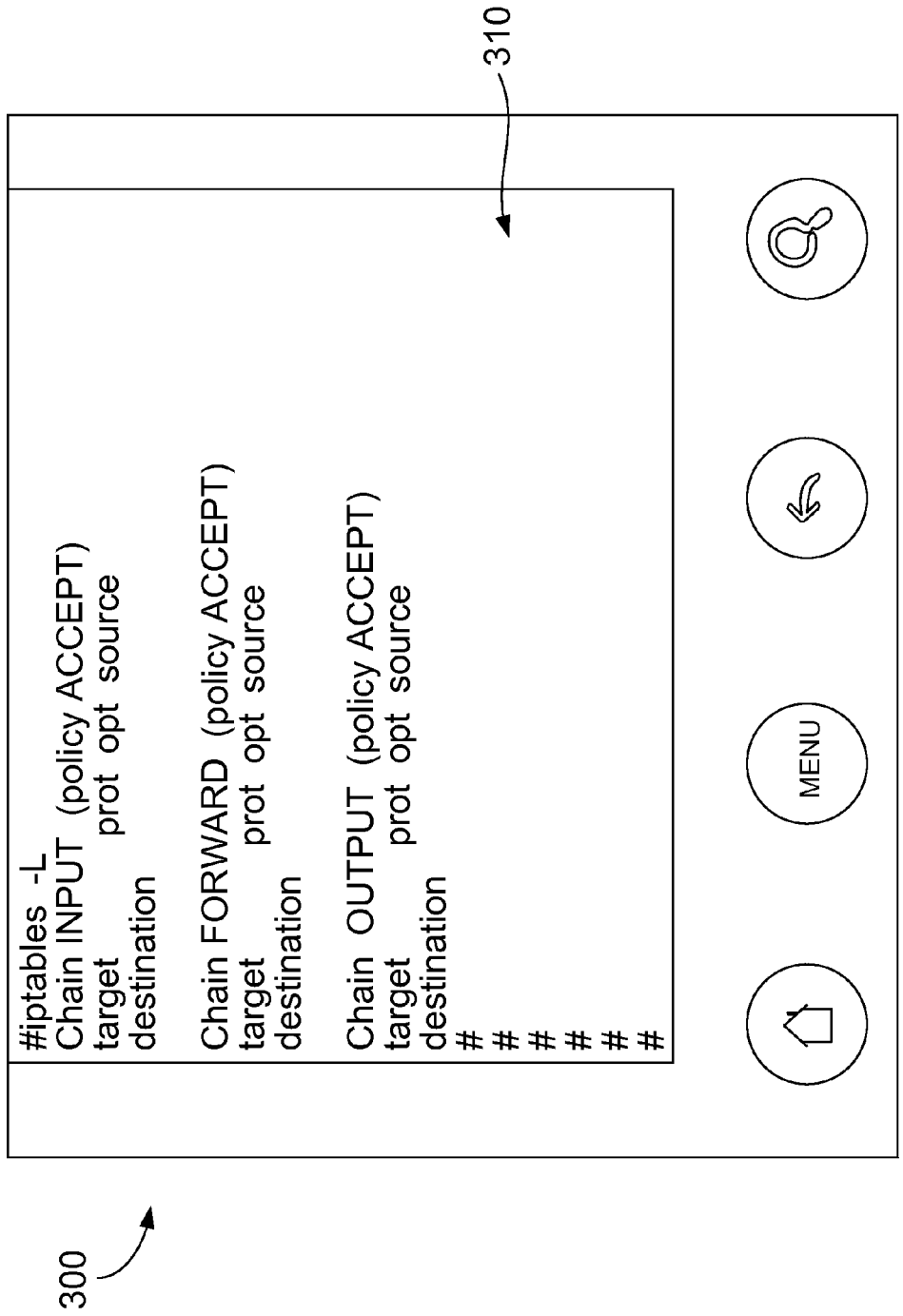
FIG. 3 is a graphical user interface illustrating a screenshot of a NAT on a wireless device that does not tether additional network elements, in accordance with an embodiment of the invention.

FIG. 3 is a graphical user interface illustrating a screenshot 310 of a NAT on a wireless device 300 that does not tether additional network elements, in accordance with an embodiment of the invention.

Without notification from the wireless device 300, the wireless network is unaware of network address translations performed on wireless devices 300 that tether network elements. In the wireless devices 300 (e.g., executing ANDROID™ operating systems), IPTABLES firewall (e.g., Iptables-f) may be used to manage packet filtering and NAT rules for a wireless device 300 operating in Hotspot mode. A wireless tethering application (e.g., wireless-tether) may enable Hotspot mode on the wireless devices 300. The wireless-tether application may configure the IPTABLES routine (already built into some wireless devices 300) to configure rules and tables for IP addresses or IP port forwarding and NAT entries.

The screenshot 310 for the wireless device 300 is an unconfigured NAT table. The NAT table contains no entries for tethered network elements. Accordingly, the notification message for the wireless device 300 may inform the tether server that wireless device 300 has not configured its NAT table and that the NAT table contains zero entries.

In some embodiments, the wireless device may provide a view of its configured NAT table having one or more entries. Based on the information corresponding to the NAT table, the wireless device generates the notification messages. The message may be used by the tether server to identify unsubscribed wireless devices that provide tethering service. Additionally, the message may be used by the tether server to identify subscribed devices that should be upgraded to a new level of service based on historical or current usage of the wireless device in Hotspot mode.

FIG. 4 is a graphical user interface illustrating a screenshot 410 of a NAT on a wireless device 400 that does tether additional network elements, in accordance with an embodiment of the invention.

The IPTABLES firewall routine may be executed on the wireless device 400 to manage packet filtering and NAT rules. The wireless device 400 may be operating in Hotspot mode, as requested by the wireless tethering application. In some embodiments, the screenshot 410 may be generated in response to a command from the notification application.

The screenshot 410 for the wireless device 400 is a configured NAT table. The NAT table contains at least one entry for tethered network elements. Accordingly, the notification message for the wireless device 400 may inform the tether server that wireless device 400 has configured its NAT table and that the NAT table contains multiple entries.

The tether server may execute a method to identify unsubscribed devices. In one embodiment, the tether server received notification messages from all wireless devices on a wireless network. The tether server then checks the list of unsubscribed and may discard notification messages coming from devices that are not one the list of unsubscribed. Alternatively, the notification messages from the subscribed wireless device may be checked to confirm compliance with bandwidth usage limits or number of tethered device limits. For noncompliant subscribed devices, the tether server may cause the wireless network to transmit an upgrade account dialog to the subscribed wireless device. In addition, the tether server may cause the wireless network to limit or shape traffic for the subscribed wireless device. For each message received from the unsubscribed wireless device that is on the list of unsubscribed, the tether server confirms that a NAT table exists and that more than one entry is located in the NAT table by checking the fields of the notification message. In turn, the tether server may generate a message that causes a register dialog message to be displayed on the unsubscribed wireless device. In addition, the tether server may limit or shape traffic for the unsubscribed wireless device based on the number of tethered network elements to it.

Figure 5:
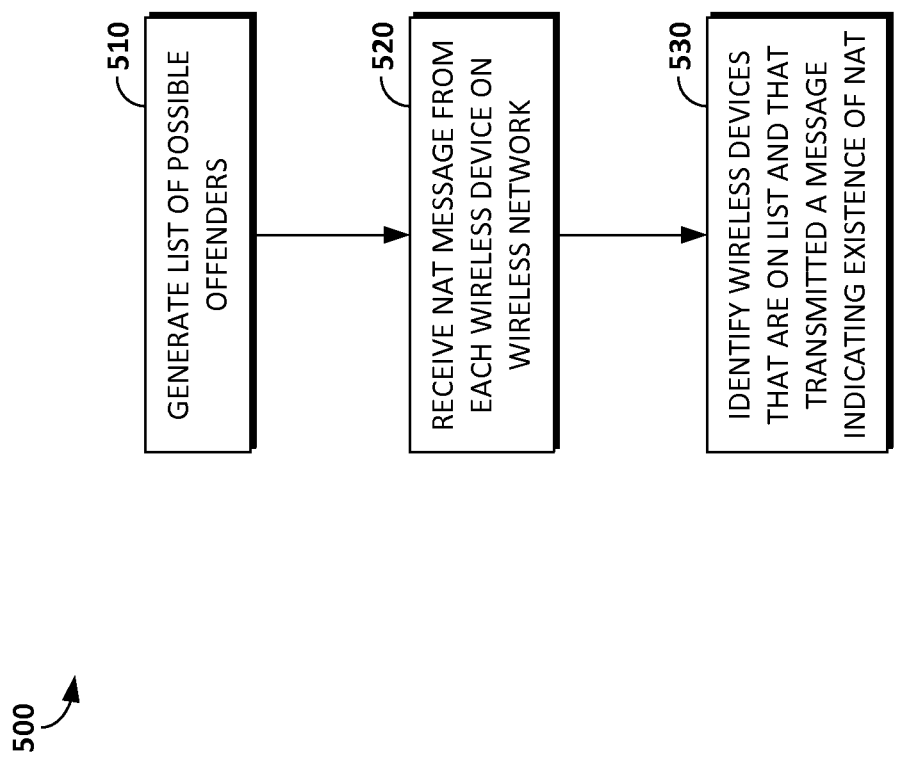
FIG. 5 is a logic diagram illustrating a method to identify wireless devices that are providing unsubscribed tethering services to network elements, in accordance with an embodiment of the invention.

FIG. 5 is a logic diagram illustrating a method 500 to identify wireless devices that are providing unsubscribed tethering services to network elements, in accordance with an embodiment of the invention. The tether server may execute this method to reduce unauthorized access to wireless network resources.

A list of possible offenders is generated, in step 510, by the tether server. The list comprises unsubscribed wireless devices and excludes wireless devices that are subscribed to tethering services. In an embodiment, the list of possible offenders may be generated at the tether server based on records accessible to an AAA server.

A notification message (e.g., NAT message) may be generated by each of the wireless devices on the wireless network. The wireless devices, in at least one embodiment, may periodically check the status NAT table and determine whether any changes (tethering one or more devices, configuring the NAT table, etc.) were made to the NAT table. The notification messages may be transmitted to the tether server for processing. The notification message may include the NAT tables stored at the wireless devices, in one embodiment. In other embodiments, the notification messages may include metadata about the NAT tables stored at the wireless devices. The metadata may confirm existence of a configured or unconfigured NAT table and the number of network elements tethered to the wireless devices.

In step 520, the tether server receives a NAT message from each wireless device on the wireless network. The tether server may periodically receive the notification messages from the wireless devices. The notification messages, in one embodiment, may be transmitted periodically to the tether server based on network congestion on the wireless network. In some embodiments, the notification messages are received more frequently when network congestion is high. Additionally, the notification messages are received less frequently at the tether server when network congestion is low. In alternate embodiments, the notification messages are received at the tether server more frequently when network congestion is low and less frequently when network congestion is high. The notification messages transmitted to the tether server may be prioritized over other network traffic, routed for delivery to the tether server, in at least one embodiment.

In certain embodiments, the tether server parses the received notification messages. The tether server, in turn, identifies wireless devices on the list that have sent a notification with an indication that a NAT table exists on the wireless device, in step 530. The tether server may cause the wireless network to take action comprising any combination of the following: shaping traffic for the identified wireless devices, blocking traffic for the identified wireless devices, transmitting a registration message to the identified wireless devices. Accordingly, the wireless devices that provide unauthorized access to the wireless network are identified and network traffic for these wireless devices is handled appropriately.

The tether server may be configured to manage wireless devices that are identified as authorized and unauthorized. For instance, an authorized wireless device may not comply with a terms of service (bandwidth usage level or tethering limits). The tether server may identify noncompliant authorized devices and cause the wireless network to take appropriate action (e.g., limiting network traffic, shaping traffic, etc.). Accordingly, the tether server manages both authorized and unauthorized devices.

Figure 6:
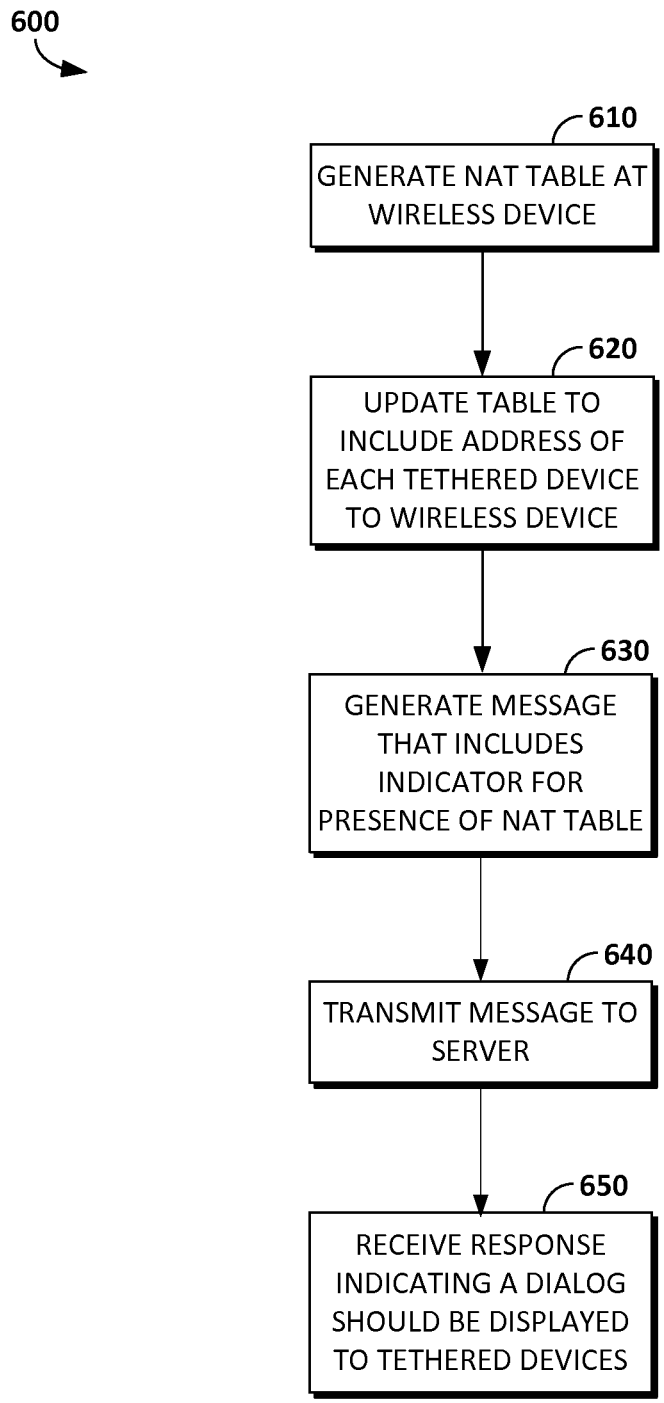
FIG. 6 is a logic diagram illustrating a method to manage wireless devices that are providing tethering services to network elements, in accordance with an embodiment of the invention.

FIG. 6 is a logic diagram illustrating a method to manage wireless devices that are providing tethering services to network elements, in accordance with an embodiment of the invention.

The wireless devices may execute an application to monitor NAT tables. In step 610, the wireless device may generate a NAT table that includes entries for the number of network elements that are tethered to the wireless device. In step 620, the wireless device updates the NAT table to include an address of each tethered device. In step 630, the wireless device generates a notification message that includes an indicator for presence of the NAT table. In step 640, the wireless device transmits the notification message to the tether server. In step 650, the wireless device receives a response indicating that a registration dialog should be displayed to tethered devices.

In summary, a tether server may identify devices providing unauthorized tethering services. The server may poll a database to generate a list of wireless devices that are not subscribed to a tethering service. The database may be maintained by an AAA server and may store records of services subscribed by the wireless devices. The server receives a notification message from each wireless device that is tethering at least one other network element. In turn, the server identifies wireless devices as unauthorized when the notification message indicates that a NAT table exists and the wireless device is on the list of wireless devices that are not subscribed to the tethering service.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system configured to identify devices providing unauthorized tethering services, the system comprising:
    a database having records of services subscribed by wireless devices; and
    a server configured to poll the database to generate a list of wireless devices that are not subscribed to a tethering service, to receive a Network-Address-Translation-Table-Present message from each wireless device that is tethering at least one other network element, and to identify wireless devices as unauthorized when the Network-Address-Translation-Table-Present message is received from the wireless device and the wireless device is on the list of wireless devices that are not subscribed to the tethering service.

2. The server of claim 1, wherein the database is provided by an AAA server.

3. The server of claim 1, wherein for each unauthorized wireless device, the server executes any of the following: blocking outgoing traffic for the unsubscribed wireless devices, or blocking incoming traffic for the unsubscribed wireless devices.

4. The server of claim 1, wherein for each unauthorized wireless device, the server executes the following: generating a notification to unsubscribed wireless devices performing tethering services.

5. A computer-implemented method that identifies devices providing unauthorized tethering services, the computer-implemented method comprising:
    storing, in a database, records of services subscribed by wireless devices;
    polling, by a computer server, the database;
    generating, by the computer server, a list of wireless devices that are not subscribed to a tethering service;
    receiving, by the computer server, a Network-Address-Translation-Table-Present message from each wireless device that is tethering at least one other network element; and
    identifying, by the computer server, wireless devices as unauthorized when the Network-Address-Translation-Table-Present message is received from the wireless device and the wireless device is on the list of wireless devices that are not subscribed to the tethering service.

6. The computer-implemented method of claim 5, wherein the database is provided by an AAA server.

7. The computer-implemented method of claim 5, wherein for each unauthorized wireless device, the server executes any of the following: blocking outgoing traffic for the unsubscribed wireless devices, or blocking incoming traffic for the unsubscribed wireless devices.

8. The computer-implemented method of claim 5, wherein for each unauthorized wireless device, the server executes the following: generating a notification to unsubscribed wireless devices performing tethering services.

9. A non-transitory computer storage media having computer-usable instructions for a computer-implemented method that when executed by a processor identifies devices providing unauthorized tethering services, the computer-implemented method comprising:
    storing, in a database, records of services subscribed by wireless devices;
    polling, by a computer server, the database;
    generating, by the computer server, a list of wireless devices that are not subscribed to a tethering service;
    receiving, by the computer server, a Network-Address-Translation-Table-Present message from each wireless device that is tethering at least one other network element; and
    identifying, by the computer server, wireless devices as unauthorized when the Network-Address-Translation-Table-Present message is received from the wireless device and the wireless device is on the list of wireless devices that are not subscribed to the tethering service.

10. The media of claim 9, wherein the database is provided by an AAA server.

11. The media of claim 9, wherein for each unauthorized wireless device, the server executes any of the following: blocking outgoing traffic for the unsubscribed wireless devices, or blocking incoming traffic for the unsubscribed wireless devices.

12. The media of claim 9, wherein for each unauthorized wireless device, the server executes the following: generating a notification to unsubscribed wireless devices performing tethering services.

* * * * *